United States Patent
Sakai et al.

(10) Patent No.: US 6,377,899 B1
(45) Date of Patent: Apr. 23, 2002

(54) METHOD OF CALIBRATING SPECTROPHOTOMETER

(75) Inventors: Masumi Sakai; Kazuo Nagasawa, both of Kyoto (JP)

(73) Assignee: Shimadzu Corporation, Kyoto (JP)

(*) Notice: Subject to any disclaimer, the term of this patent is extended or adjusted under 35 U.S.C. 154(b) by 0 days.

(21) Appl. No.: 09/383,886

(22) Filed: Aug. 26, 1999

(30) Foreign Application Priority Data

Aug. 28, 1998 (JP) ............................................ 10-243821

(51) Int. Cl.⁷ ........................ G01C 25/00; G06F 15/20
(52) U.S. Cl. ........................ 702/104; 702/85; 702/94; 702/104; 702/105; 356/319; 356/326; 356/331; 250/559.1
(58) Field of Search ................................. 402/104, 105, 402/106, 85; 356/73, 319, 326, 331; 250/234, 235, 236, 216, 559.1, 345; 702/94

(56) References Cited

U.S. PATENT DOCUMENTS 4,223,995 A * 9/1980 Flecher ........................ 356/418
4,779,216 A * 10/1988 Collins ........................ 702/94
5,557,404 A * 9/1996 Matsui et al. ............... 356/319

* cited by examiner

*Primary Examiner*—Marc S. Hoff
*Assistant Examiner*—Hien Vo
(74) *Attorney, Agent, or Firm*—Beyer Weaver & Thomas LLP

(57) ABSTRACT

For calibrating a spectrophotometer having a monochromator with a rotary mechanism to rotate a diffraction grating for producing a monochromatic beam of light of a specified target wavelength, transmission errors by the rotary mechanism are preliminarily measured to obtain an error curve having peaks corresponding to feed angles. A smallest angular interval, greater than an allowable limit, between a pair of feed angles corresponding to a mutually adjacent pair of peaks in the error curve is selected. One or more lamps emitting bright lines with wavelength interval which corresponds to motion of the rotary mechanism by less than one half of the selected smallest angular interval are used as a light source. Control values to be supplied to the rotary mechanism for obtaining monochromatic beams of light from the bright lines emitted from the selected lamps are determined by measurements. A calibration table, from which a required control value corresponding to a specified wavelength value can be retrieved, is produced from these control values and wavelength values of the bright lines and is stored in a memory device.

5 Claims, 5 Drawing Sheets

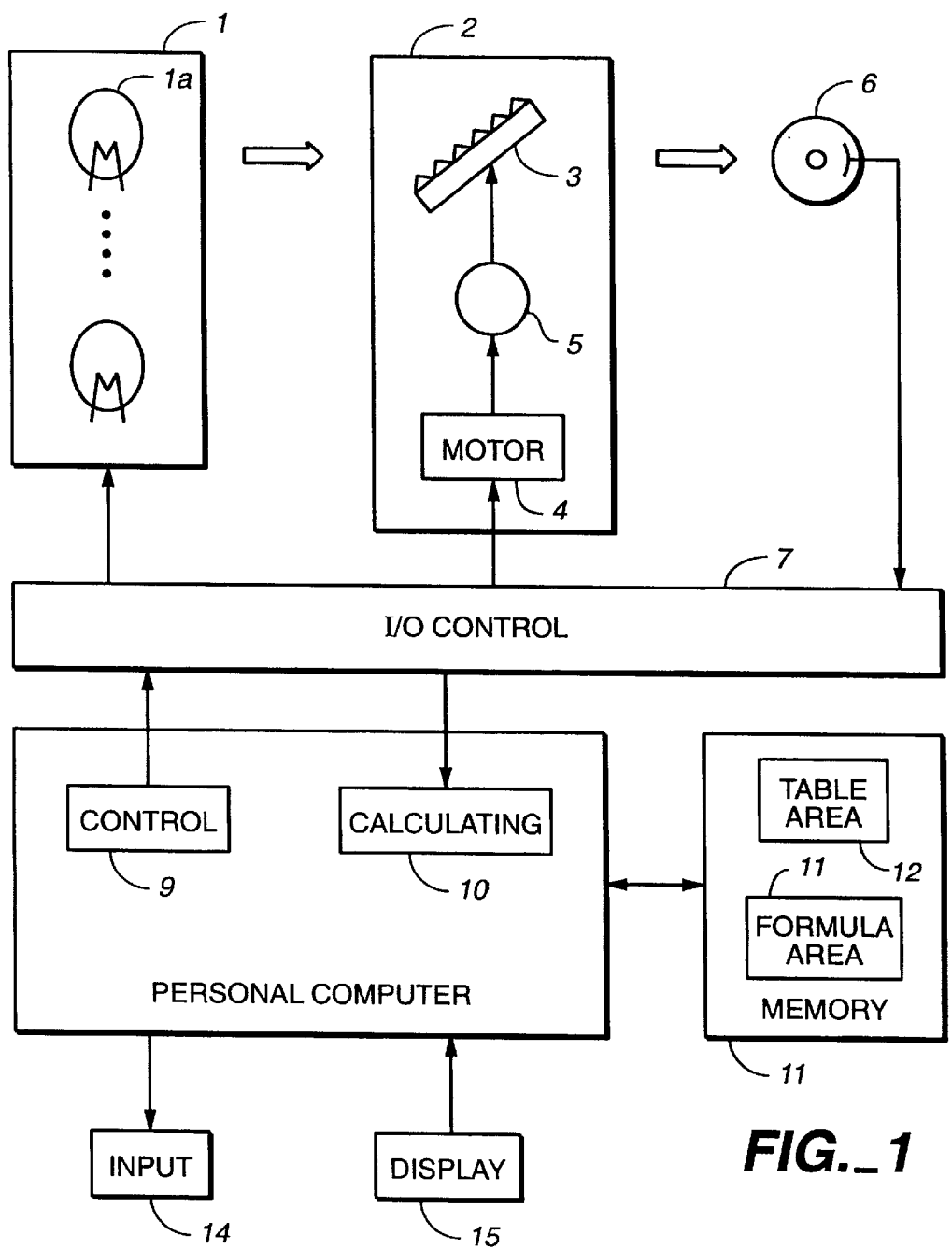
FIG._1

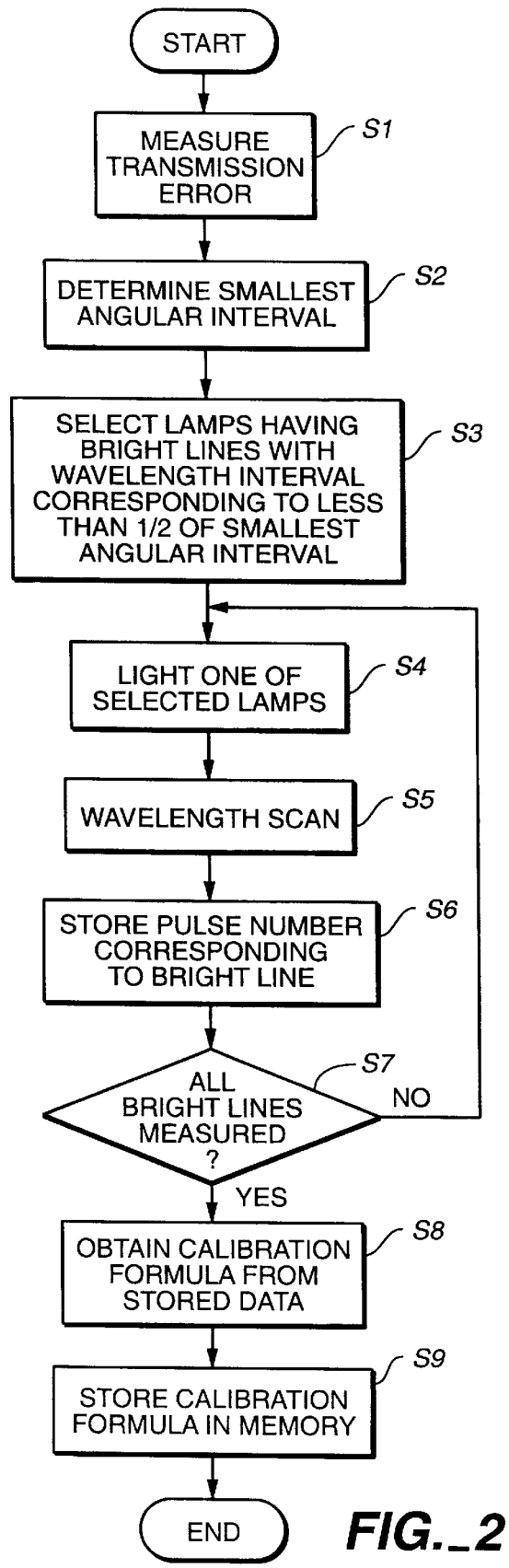
FIG._2

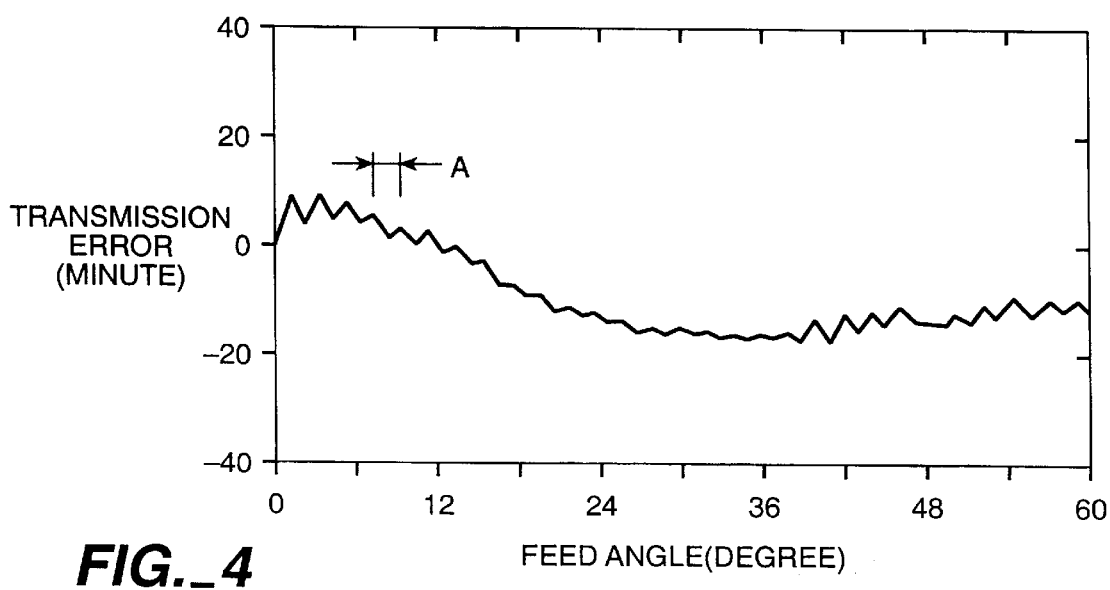
FIG._3
FIG._4

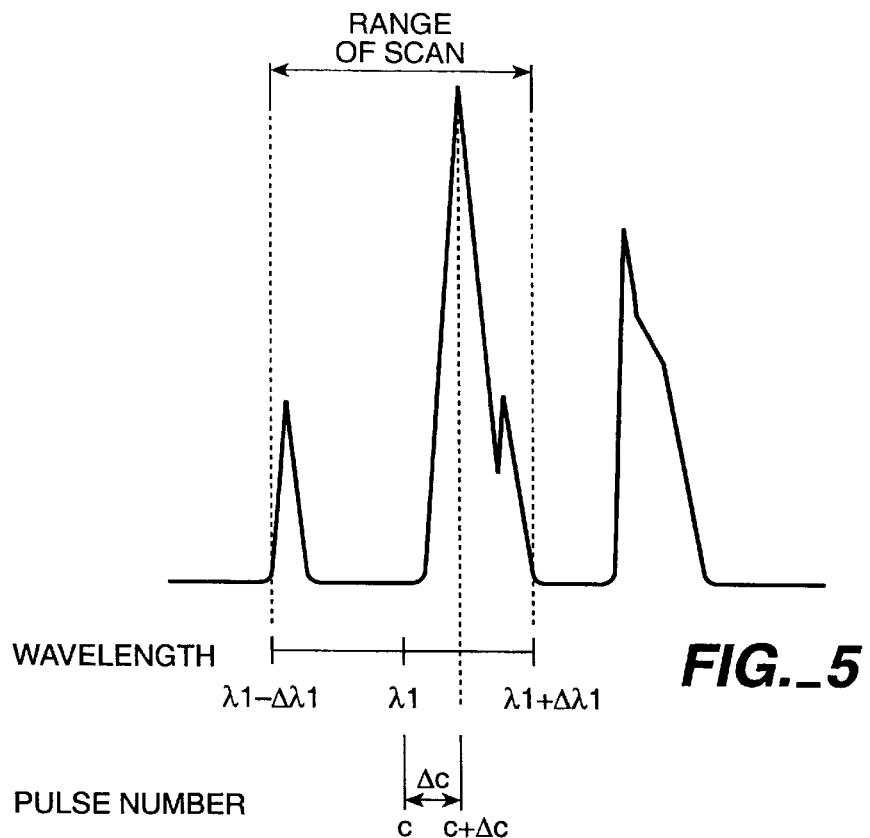
FIG._5
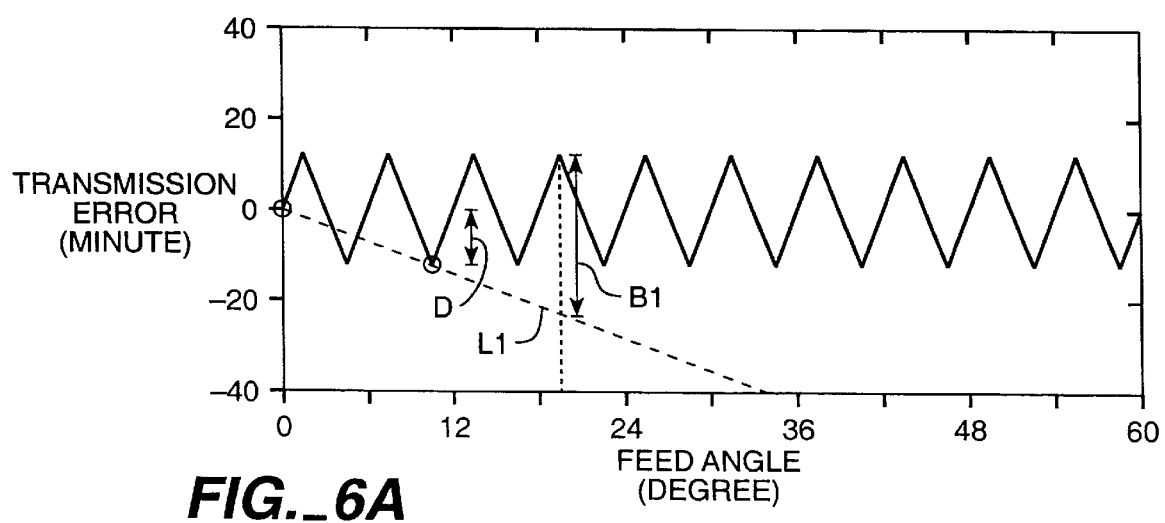
FIG._6A

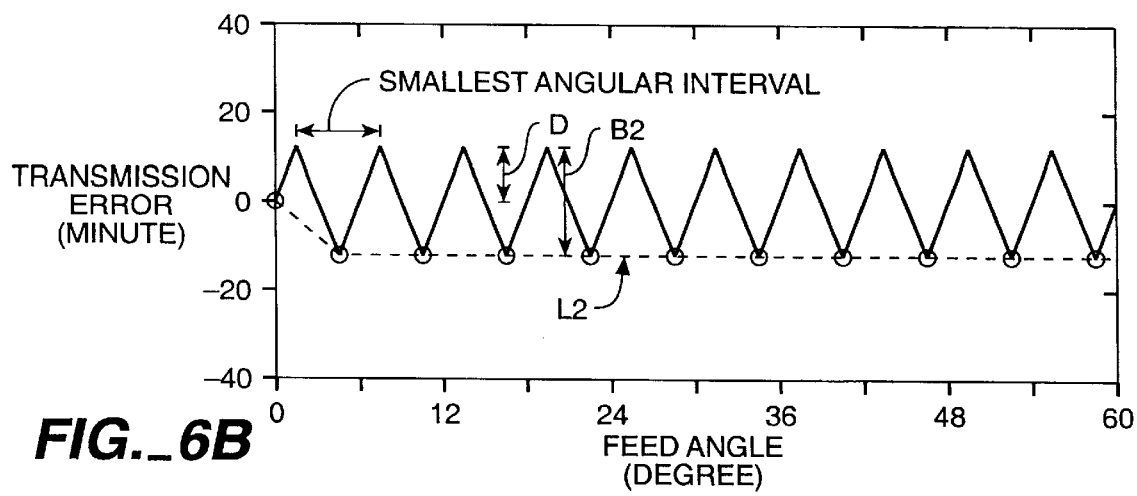
FIG._6B
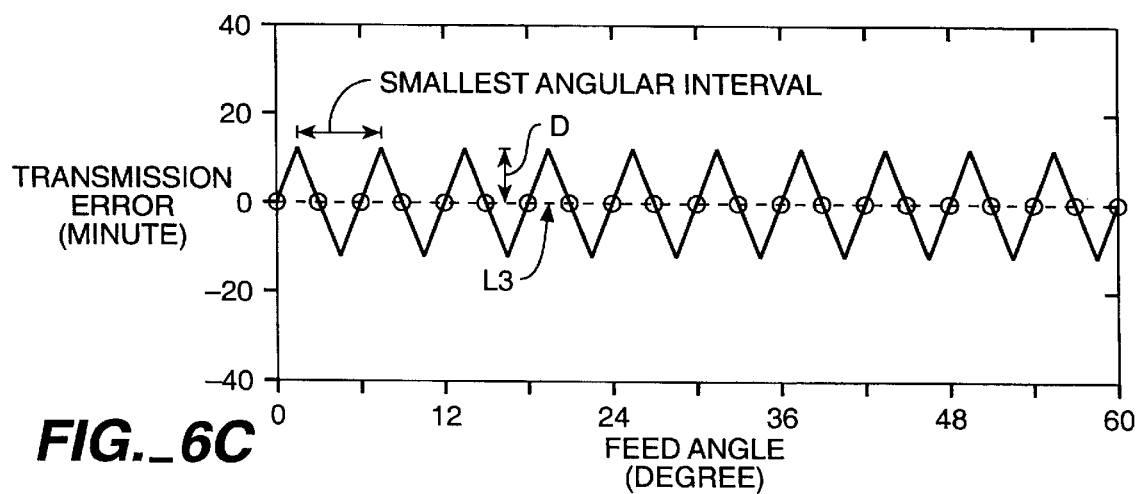
FIG._6C
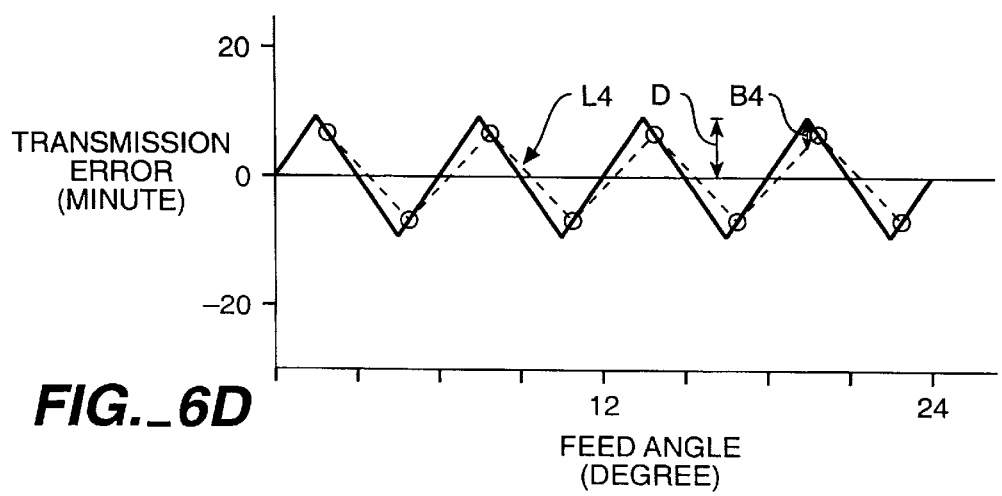
FIG._6D

METHOD OF CALIBRATING SPECTROPHOTOMETER

BACKGROUND OF THE INVENTION

This invention relates to a method of calibrating a spectrophotometer provided with a monochromator for outputting a monochromatic beam of light with a specified wavelength such that the difference between the wavelength of the actually outputted light and the specified wavelength can be eliminated.

Spectrophotometers such as ultraviolet, visible light and atomic absorption spectrophotometers are provided with a monochromator for obtaining a monochromatic beam of light with a specified wavelength. In general, a monochromator comprises a wavelength-dispersing element such as a diffraction grating or a prism and a rotary mechanism for changing the orientation of such a wavelength-dispersing element with respect to an incident beam of light. The orientation of the wavelength-dispersing element is adjusted by the rotary mechanism such that a monochromatic beam of light with a specified wavelength can be outputted through a fixed slit. Since a diffraction grating is widely being used as the wavelength-dispersing element, the wavelength-dispersion element will be referred to as the diffraction grating in the following description.

As for the rotary mechanism for changing the orientation of the diffraction grating of a monochromator, it has been known to make use of a sine bar mechanism to convert a linear motion into a rotary motion, an open-loop control by means of a combination of a stepping motor and a deceleration gear mechanism or a closed-loop control by means of a DC servo motor. If a combination of a stepping motor and a deceleration gear mechanism is used, for example, the known formula of optics relating the orientation of the diffraction grating with the wavelength of the diffracted output light, as well as the design relationship between the angular position of the drive shaft of the stepping motor and the rotary angle of the deceleration gear mechanism, must be considered to establish an ideal relationship between the number of driving pulses which controls the motor and the wavelength of the output light.

Because of many factors such as the mechanical errors in precision by the rotary mechanism, errors in the diffraction constant of the diffraction grating or in the coefficient of refraction of the prism, and errors in the positioning of the optical components, however, the wavelength of the output light is not always equal to the target wavelength as accurately as desired. In the past, attempts have been made to reduce the inaccuracy by using more accurate mechanical and optical components and/or increasing the size of the monochromator itself such that the effect of the inaccuracy will be somewhat reduced. Such a method of improving the accuracy in wavelength is not desirable because of the cost and also because the spectrophotometer cannot be made compact.

More recently, there has been proposed a method whereby a spectrum of known wavelengths is used such as the zero-order bright line spectrum of a deuterium lamp and a spectrum of a mercury lamp with a plurality of bright lines. A variation which actually appears is obtained corresponding to a specified input to the rotary mechanism such as the number of driving pulses sent to a stepping motor and the monochromator is calibrated by using the observed variation.

A deuterium lamp and a mercury lamp emit at most only about ten bright lines and the intervals between these bright lines are not even. Moreover, the transmission error by a rotary mechanism does not increase of decrease uniformly with respect to the input angle. As a result, there is no guarantee that the calibration effort by such a prior art method is producing a desirable effect. The accuracy may be becoming worse by such an attempt at calibration.

SUMMARY OF THE INVENTION

It is therefore an object of this invention, in view of the above, to provide a method of calibrating a spectrophotometer accurately over the entire range of wavelength used thereby by using relatively inexpensive mechanical components and a light source which is easily obtainable.

A method according to this invention, with which the above and other objects can be accomplished, may be characterized as comprising the steps of preliminarily measuring transmission errors by the rotary mechanism for the monochromator to obtain an error curve with fluctuations for the rotary mechanism, selecting a smallest angular interval between a pair of feed angles corresponding to successive ones of peaks in the fluctuating error curve, selecting one or more light sources emitting bright lines with wavelength interval which corresponds to motion of the rotary mechanism by less than one half of the smallest angular interval, determining control values to be supplied to the rotary mechanism for obtaining monochromatic beams of light from the bright lines emitted from the light sources, producing from the control values and wavelength values of the bright lines a calibration table from which a required control value corresponding to a specified wavelength value can be retrieved, and storing this calibration table in a memory device.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a block diagram of an essential portion of a spectrophotometer for using a method of calibration embodying this invention;

FIG. 2 is a flow chart of a method embodying this invention;

FIG. 3 is a portion of an example of calibration table showing the relationship between wavelength and pulse number;

FIG. 4 is a graph which shows the relationship between the transmission error and the feed angle of a rotary mechanism;

FIG. 5 is a graph which shows an example of result in the measurement of wavelength error; and FIGS. 6A, 6B, 6C and 6D are graphs which show different effects which may be obtained by selecting different calibration data when the transmission error changes in a periodic manner.

DETAILED DESCRIPTION OF THE INVENTION

The invention is described next by way of an example. FIG. 1 shows an essential portion of a spectrophotometer adapted to be calibrated by a method according to this invention. Several lamps 1a of different kinds are set in a light source part 1 such that light emitted from a selected one of these lamps 1a will be introduced into a monochromator 2. The monochromator 2 includes a diffraction grating 3 which can be rotated within a specified angular range, a stepping motor 4 and a deceleration gear mechanism 5 for decelerating the rotary motion of the drive shaft of the stepping motor 4 and thereby causing the diffraction grating 3 to undergo a rotary motion. Thus, the diffraction grating 3 can be rotated to assume a specified orientation according to the number of pulses supplied to the stepping motor 4.

The monochromatic light from the monochromator 2 is detected by an optical detector 6, sampled by an input/output (I/O) control part 7 at suitable time intervals and inputted to a personal computer 8 after it is converted into digital data. In the case of an ultraviolet or visible light spectrophotometer, a sample to be analyzed is inserted between the monochromator 2 and the detector 6. In the case of an atomic absorption spectrophotometer, an atomizer for atomizing the sample is inserted into the optical path between the light source part 1 and the monochromator 2. These components are omitted from FIG. 1 and are not shown.

The personal computer 8 functionally includes a control part 9 which controls the operations of the parts described above and a calculating part 10 for carrying out various data processing. Peripherals such as a memory device 11, an input device 14 and a display device 15 are connected to the personal computer 8. The memory device 11 has memory areas such as a table area 12 for storing a conversion table and a formula area 13 for storing a calibration formula. When the calculating part 10 produces a calibration formula by correcting an error in the wavelength on the basis of data obtained from the detector 6, as will be explained more in detail below, the calibration formula thus obtained is stored in this formula area 13. The control part 9 also serves to control the light source part 1 and the stepping motor 4 through an input from the input device 14 at the time of a calibration process.

A conversion table showing the relationship between the number of pulses to be given to the stepping motor 4 and the wavelength of light from the monochromator 2 is preliminarily stored in the table area 12 of the memory device 11. This table shows the ideal (or theoretical) relationship between the wavelength and the pulse number calculated by using the formula of optics relating the orientation of the diffraction grating 3 with the wavelength and the design relationship between the stepping motor 4 and the deceleration gear mechanism 5.

An example of conversion table is shown in FIG. 3. According to this table, 4337 pulses are sent to the stepping motor 4 if a beam of monochromatic light with wavelength 194. 1 nm is desired outputted from the monochromator 2 so as to rotate the diffraction grating 3 to change its orientation. In the table shown in FIG. 3, the pulse numbers are given corresponding to the wavelengths in the smallest steps 0.1 nm for the spectrophotometer. The pulse numbers not on the table may be obtained therefrom by interpolation.

Ideally, it should be possible to obtain a beam of monochromatic light with a desired wavelength by making use of a conversion table as shown above. In reality, however, the angle of orientation of the diffraction grating 3 is not accurately set even if a number of pulses retrieved from the conversion table are transmitted to the stepping motor 4 because of various factors such as the errors due to the deceleration gear mechanism 5. For this reason, a process described below is carried out to make corrections after the monochromator 2 has been assembled or after it has been repaired at a work site.

FIG. 2 shows a flow chart of this process. Initially, before the monochromator 2 is assembled, the error in the angular transmission ("transmission error") with respect to the rotary angle of the drive shaft of the stepping motor 4 ("feed angle") is measured (Step S1). A rotary encoder capable of measuring such errors with sufficient accuracy may be used for this purpose. The result of such a measurement is a fluctuating curve with successively appearing peaks as shown in FIG. 4. Next, the graph thus obtained is studied and the smallest angular interval between a mutually adjacent pair of peaks in this fluctuating curve is determined (Step S2). Although it is ideally desirable to determine the smallest interval from the entire range, since it is meaningless to consider angular intervals corresponding to amplitudes within the allowable limit of error for the monochromator 2, the smallest angular interval corresponding to an amplitude greater than this allowable limit is selected. In FIG. 4, letter A indicates the smallest angular interval thus determined.

Next, one half of this smallest angular interval is converted by calculation into a wavelength interval $\Lambda$, and lamps having a bright line spectrum with a smaller wavelength interval than this calculated interval $\Lambda$ are selected as the light source (Step S3). The reason for this selection will be explained below.

In general, since it is practically impossible to obtain a plurality of such bright lines from a single lamp, use is made of a lamp preliminarily installed in the spectrophotometer in combination with another lamp which is easily available and has many groups of bright lines with high intensities. In the case of a visible light or ultraviolet spectrophotometer, for example, a deuterium lamp, a low-pressure mercury lamp and a neon lamp may be combined. In the case of an atomic absorption spectrophotometer, a deuterium lamp and a mercury hollow cathode lamp may be combined. In this manner, it is possible to obtain 20–30 bright lines which are usually sufficient for the purpose of wavelength calibration. It goes without saying in the above explanation, however, that only the groups of bright lines within the range of wavelengths usable by the spectrophotometer are of importance. With most spectrophotometers, bright lines in the vacuum ultraviolet region with wavelengths less than 180 nm are unnecessary.

It is to be noted that the aforementioned measurement in Step S1 must be done by an operator because a special instrument such as a rotary encoder must be used. The processes in Steps S2 and S3, on the other hand, can be performed automatically, for example, by inputting the results of measurement on the errors into the personal computer 8 through the input device 14 such as a keyboard, automatically finding a smallest angular interval by a specified software program, automatically selecting one or more lamps out of many kinds of lamps preliminarily registered as candidates which will satisfy the required condition described above and to inform the selection to the user.

After one or more lamps are thus selected, the selected lamp or lamps are installed in the light source part 1 and the start of a wavelength calibration process is communicated to the personal computer 8 from the input device 14. In response, the control part 9 controls the light source part 1 through the input/output control part 7, lighting one (such as the one indicated by symbol 1a) of the selected lamps (Step S4). Moreover, the control part 9 functions to sequentially read out of the conversion table in the table area 12 of the memory device 11 the pulse numbers corresponding to a range of wavelengths centered around the wavelength of one of the bright lines contained in the light emitted from this lamp 1a and to send out these numbers of pulse signals to the stepping motor 4. As a result, the diffraction grating 3 rotates by small angles and light beams having correspondingly different wavelengths are sequentially introduced into the detector 6 (Step S5).

During this scanning process, the calculating part 10 sequentially receives through the input/output control part 7 the data obtained by the detector 6 and detects peaks in the spectrum of bright lines. Let us assume now that a spectrum as shown in FIG. 5 has been obtained by scanning within a range of $\pm\Delta\lambda 1$ around wavelength $\lambda 1$ of a bright line (the corresponding pulse number according to the conversion table being c). Ideally, the top of the peak should appear at a position corresponding to the pulse number c but this is not always the case. FIG. 5 shows a situation where the highest peak appears at an off-center position corresponding to pulse number $c+\Delta c$. In other words, the actual pulse number taking mechanical and other errors into account corresponding to the wavelength $\lambda 1$ of the bright line is $c+\Delta c$, there being a change in wavelength corresponding to the pulse number $\Delta c$.

Next, the pulse number $c+\Delta c$ (or the shift $\Delta c$ in the pulse number) corresponding to wavelength $\lambda 1$ is temporarily stored in an internal RAM (Step S6). After data corresponding to one of the bright lines have been collected, the program returns from Step 7 to Step 4 and the relationship between wavelength and pulse number on another bright line corresponding to a different wavelength is similarly stored temporarily in the internal RAM. When a plurality of lamps have been selected, the control unit 9 controls the light source part 1 to switch on another of the lamps and the program returns from Step S7 to Step S4 after data on all required bright lines have been collected with a first lamp, collecting and temporarily storing in the internal RAM the relationship between wavelength and pulse number.

When all required data on the bright lines from all lamps have been collected (YES in Step S7), a calibration formula is calculated for converting the data on pulse numbers given by the conversion table into corrected data on pulse numbers for obtaining monochromatic light without shifts in wavelengths on the basis of the many data which are diverging in the direction of wavelength (Step S8). This calibration formula is a general formula representing a line obtained by interpolating the many data points obtained as above by straight or other approximating lines, the simplest method of deriving such a formula being to connect them with straight lines. If a more accurate calibration formula is desired, the data points may be connected by curves of a higher order in a known manner. Once obtained, such a calibration formula is stored in the formula area 13 of the memory device 11 (Step S9).

The accuracy in wavelength is dependent nearly entirely on the transmission error due to the deceleration gear mechanism 5 and the transmission errors have a high repeatability unless the mechanical components are exchanged. Thus, once a calibration formula is derived, the same calibration formula can usually be used continuously. When it is believed that a new calibration formula must be derived, say, after the apparatus has been adjusted, a new calibration formula can be derived by repeating the process described above.

When a measurement is to be taken by using a spectrophotometer as described above, both the conversion data table stored in the table area 12 and the calibration formula stored in the formula area 13 of the memory device 11 are used to calculate the pulse numbers corresponding to the desired wavelengths. Once a desired range of wavelength to be scanned is specified, for example, the calculating part 10 functions not only to read out of the conversion table in the table area 12 the pulse numbers corresponding to the minimum and maximum wavelengths of this specified range but also to read out the calibration formula in the formula area 13 such that corrected pulse numbers are obtained by substituting these retrieved pulse numbers into this calibration formula. The corrected numbers of pulses are then transmitted by the control unit 9 to the stepping motor 4 to set the diffraction grating 3 in a specified orientation.

Next, the pulse number corresponding to a wavelength which is within the specified range and is separated from the minimum or maximum wavelength of the range by a specified amount is read out of the conversion table and calibrated, and a corresponding pulse signal is transmitted to the stepping motor 4 to further rotate the diffraction grating 7. The diffraction grating 7 is thus rotated sequentially by small incremental angles such that beams of monochromatic light with corrected shifts in wavelength can be outputted from the monochromator 2.

Next, the reason for using bright lines with wavelengths separated by an amount corresponding to the difference in angles smaller than one-half of the smallest angular interval will be explained with reference to FIGS. 6A, 6B, 6C and 6D (together referred to as FIG. 6) which show a situation wherein the transmission error varies periodically around zero minute.

Let us attempt to derive a calibration formula of the type discussed above by using data of only two points obtained on the basis of bright lines with two wavelengths and by using straight interpolating lines. If these two wavelengths of bright lines correspond to feed angles 0° and 10.5°, as indicated by small circles in FIG. 6A, the straight interpolation line between the data at these two points is the dotted line L1. If this line is to be used as the calibration line corresponding to the calibration formula, the transmission error at feed angle 19.5° after the calibration is indicated by the difference B1 between the real value and the value on the dotted line. Thus, if this interpolating line is used as the calibration line, the error becomes greater after the calibration than the original error D before the calibration.

Next, let us try to derive a calibration formula by using data obtained from a plurality of bright lines separated uniformly by a wavelength differential which is the same as the minimum interval by using straight interpolating lines. If the feed angles corresponding to the wavelengths of these bright lines happened to coincide with the feed angles corresponding to the negative peaks (or valleys) of the periodic variation of the transmission error, as shown in FIG. 6B, the interpolating line connecting these data points (again indicated by small circles) is as indicated by symbol L2. The transmission error at feed angle 19.5° in this case is B2, which again is greater than the error before the calibration. In other words, there are still situations wherein the transmission error becomes greater by the calibration than the the original error D, depending on the wavelength at which the effect of the calibration is considered.

Finally, let us derive a calibration formula by using data obtained from a plurality of bright lines separated uniformly by the wavelength differential corresponding to one half of the minimum angular interval and using straight interpolating lines. In this case, as shown in FIG. 6C, the worst situation is when the feed angles corresponding to the wavelengths of the bright lines are 3°, 6°, 9°, etc. such that the calibration line, as indicated by symbol L3, has a constant value equal to the transmission error at feed angle of 0°. This is because no improvement can be obtained by the calibration in this situation, but this means that the error does not become greater even under a worst condition.

In reality, it is rare that such a worst situation is encountered. FIG. 6D shows a more typical example of situation where a calibration line L4 is obtained by using data obtained from bright lines separated uniformly by the same wavelength differential of 3° but not at 3°, 6°, 9°, etc. In this situation, the transmission error at feed angle 19.5° is B4 which is smaller than the original error D.

In other words, in most situations, the error in wavelength is significantly reduced. In summary, if measured data are collected at an angular interval less than one half of the angular difference and calibration is effected by using a calibration formula obtained by using these data points, errors in wavelength can be reduced from the situation wherein the stepping motor 4 is operated on the basis of the conversion table obtained theoretically.

Although the invention was described above by way of an example wherein a calibration equation is to be used in order to convert the pulse number, a new conversion table may be created for showing the correspondence between the calibrated pulse numbers and the wavelengths. Such a new conversion table may be stored in a memory device and used at the time of spectrophotometry. The light source part 1 may be structured such that the operator would manually exchange the lamps.

Thus, many modifications and variations are possible within the scope of the invention, and the present invention makes it possible to eliminate the effects of errors in angles in the operation of the rotary mechanism by way of calibration such that a monochromatic beam of light with accurate wavelength can be outputted. In other words, even an inexpensive rotary mechanism with relatively large transmission errors can be used in a spectrophotometer. Moreover, there is no need to employ a large device in order to improve the accuracy or to use any special lamp for calibration. As a result, accurate spectrophotometry is possible with a relatively inexpensive and compact spectrophotometer. It also goes without saying that the present invention is applicable also to the kind of monochromators adapted to move the diffraction gratings or the exit slit itself to vary the output wavelength.

What is claimed is:

1. A method of calibrating a spectrophotometer having a monochromator for producing a monochromatic beam of light of a specified target wavelength by a rotary mechanism, said method comprising the steps of:

preliminarily measuring transmission errors by said rotary mechanism to obtain an error curve having peaks corresponding to feed angles of said rotary means;

selecting a smallest angular interval between a pair of said feed angles corresponding to a mutually adjacent pair of said peaks in said error curve, said smallest angular interval being greater than a specified allowable limit;

selecting one or more lamps emitting bright lines with wavelength interval which corresponds to motion of said rotary mechanism by less than one half of said smallest angular interval;

determining by measurements control values to be supplied to said rotary mechanism for obtaining monochromatic beams of light from said bright lines emitted from said selected one or more lamps;

producing from said control values and wavelength values of said bright lines a calibration table from which a required control value corresponding to a specified wavelength value can be retrieved; and storing said calibration table in a memory device.

2. The method of claim 1 wherein said monochromator includes a light dispersing element for dispersing incident light and said rotary mechanism includes a stepping motor and serves to change orientation of said light dispersing element.

3. The method of claim 1 wherein said smallest angular interval is selected by a personal computer according to a specified software program.

4. The method of claim 3 further comprising the step of sending a signal from an input device to cause said personal computer to start the step of determining said control values.

5. The method of claim 1 wherein said calibration table is produced by scanning over a specified range of wavelengths around each of said wavelength values in detecting output light from each of said one or more lamps.

* * * * *